United States Patent [19]

Cody et al.

[11] Patent Number: 4,505,886
[45] Date of Patent: Mar. 19, 1985

[54] PROCESS FOR PREPARING HIGH QUALITY TITANIUM DIOXIDE

[75] Inventors: Charles A. Cody, East Windsor; William W. Reichert, Plainsboro; Steven J. Kemnetz, Trenton; Edward D. Magauran, Mt. Holly, all of N.J.

[73] Assignee: NL Industries, Inc., New York, N.Y.

[21] Appl. No.: 510,249

[22] Filed: Jul. 1, 1983

[51] Int. Cl.³ .......................................... C01G 23/053
[52] U.S. Cl. ..................................... 423/616; 423/82; 423/610; 423/615
[58] Field of Search ........................ 423/610, 615, 616

[56] References Cited

U.S. PATENT DOCUMENTS

| | | | |
|---|---|---|---|
| 1,758,528 | 5/1930 | Mecklenburg | 423/615 |
| 1,795,467 | 3/1931 | Blumenfeld | 423/616 |
| 1,853,626 | 4/1932 | Leuchs | 423/84 |
| 2,029,881 | 2/1936 | Little | 23/202 |
| 2,089,180 | 8/1937 | Bousquet et al. | 23/202 |
| 2,133,941 | 10/1938 | Allan | 23/202 |
| 2,182,420 | 12/1939 | Allan et al. | 23/202 |
| 2,203,305 | 11/1942 | Tillmann | 23/202 |
| 2,203,306 | 11/1942 | Tillmann et al. | 23/202 |
| 2,203,307 | 11/1942 | Tillmann et al. | 23/202 |
| 2,285,485 | 6/1942 | Barksdale et al. | 23/202 |
| 2,292,507 | 8/1942 | Brooks | 23/202 |
| 2,331,496 | 10/1943 | Olson | 23/202 |
| 2,444,939 | 7/1948 | Mayer | 23/202 |
| 2,444,940 | 7/1948 | Mayer et al. | 23/202 |
| 2,448,683 | 9/1948 | Peterson | 23/202 |
| 2,516,604 | 7/1950 | Tanner | 23/202 |
| 3,062,673 | 11/1962 | Wigginton | 106/300 |
| 3,071,439 | 1/1963 | Solomka | 23/202 |
| 3,615,204 | 9/1969 | Affton et al. | 23/202 |
| 3,617,217 | 9/1969 | Heywood et al. | 23/202 |
| 3,625,650 | 12/1971 | Libera et al. | 23/202 |
| 3,706,829 | 12/1972 | Solomka et al. | 423/615 |
| 4,073,877 | 2/1978 | Klein et al. | 423/616 |
| 4,275,040 | 6/1981 | Davis | 423/82 |
| 4,275,041 | 6/1981 | Waldman et al. | 423/82 |
| 4,288,415 | 9/1981 | Rahm et al. | 423/82 |
| 4,288,416 | 9/1981 | Davis et al. | 423/82 |

FOREIGN PATENT DOCUMENTS

| | | |
|---|---|---|
| 310949 | 12/1929 | United Kingdom. |
| 470266 | 8/1937 | United Kingdom. |
| 542579 | 1/1942 | United Kingdom. |
| 596656 | 1/1948 | United Kingdom. |
| 976080 | 11/1964 | United Kingdom. |
| 1584727 | 2/1981 | United Kingdom. |

*Primary Examiner*—Herbert T. Carter
*Attorney, Agent, or Firm*—Burns, Doane, Swecker & Mathis

[57] ABSTRACT

A process for preparing high quality titanium dioxide which exhibits excellent reflectance and tint strength when incorporated into a coating formulation. The process involves the preparation of a seed solution wherein one of the seed curing factors of time, temperature and amount of alkaline neutralizing agent are varied to establish maximum reflectance and tint strength values obtained by the final product. The process can be repeated to analyze one or both of the other factors. The process can be used to prepare titanium dioxide in the anatase or rutile form and on a batch or continuous basis.

18 Claims, 2 Drawing Figures

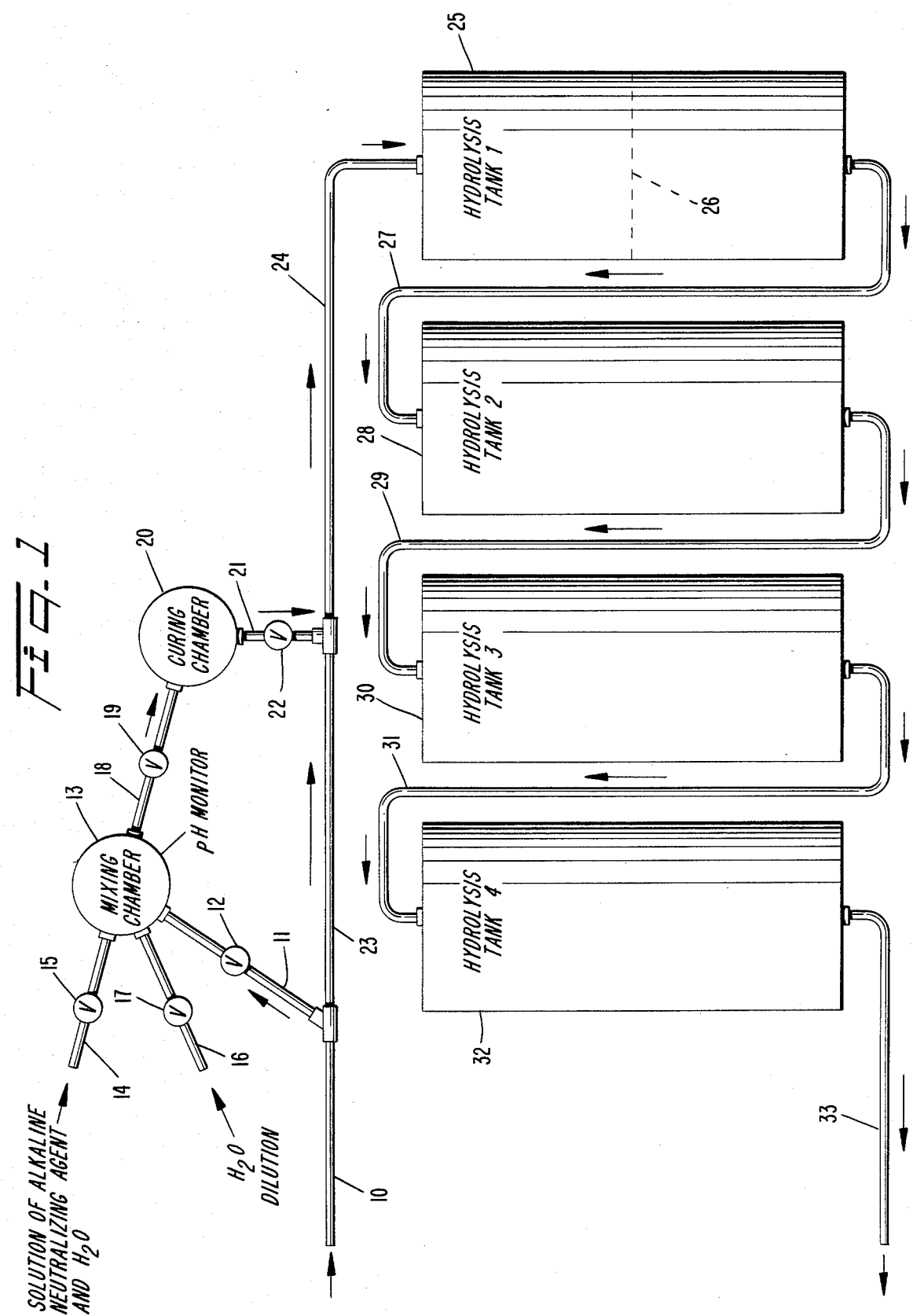

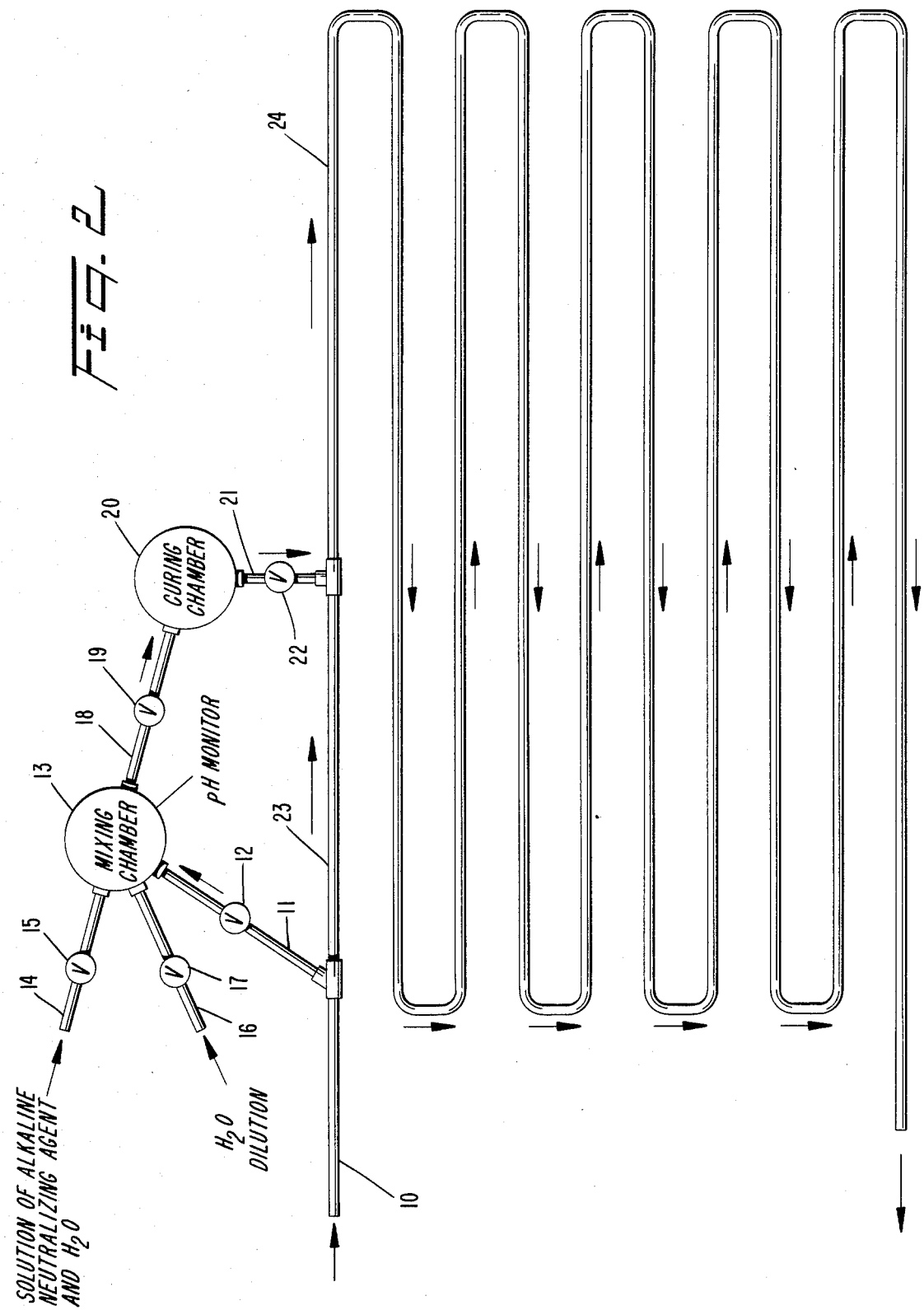

PROCESS FOR PREPARING HIGH QUALITY TITANIUM DIOXIDE

BACKGROUND OF THE INVENTION

1. Field of the Invention

The present invention relates to a process for preparing high quality titanium dioxide which may be in the anatase or rutile crystal form.

2. Description of the Prior Art

The preparation of titanium dioxide has been accomplished via various techniques. In one well known process commonly referred to as the "Blumenfeld Process" (see U.S. Pat. No. 1,795,467), a titanium sulfate solution prepared by the action of sulfuric acid on titanium bearing ores, such as ilmenite or rutile, is heated and the solution is mixed with a quantity of hot water. A precipitate of hydrous titanium oxide immediately forms, but dissolves on continued addition of the titanium sulfate solution. Upon continued heating, the hydrous titanium oxide again begins to precipitate and after several hours it is completed whereby a yield of around 95% may be obtained.

In another well established process described in U.S. Pat. No. 1,758,528, a small amount of a titanium salt solution which has been neutralized with an alkaline agent to a pH within the range of 4.0 to 4.5 is added as a seed suspension to a titanium salt solution and the mixture is heated. According to the patent, the process results in a high yield (e.g., about 95%) of titanium dioxide hydrate.

In U.S. Pat. No. 2,029,881, hydrolysis of titanium salt solutions is hastened by the addition of a dry alkali metal titanate.

More recently, high quality titanium dioxide has been prepared by more specialized hydrolysis procedures. For example, in U.S. Pat. No. 3,615,204, a measured quantity of a defined clarified, uncrystallized and unconcentrated titanium sulfate-ferrous sulfate solution is added to an empty precipitation tank. A nucleating agent containing 12 to 16% solids, which solids are composed of 85 to 89% $TiO_2$ and 11 to 15% $Na_2O$ at a mole ratio of $TiO_2:Na_2O$ in the range of from 5.7 to 8.1:1.0, is added to the solution under agitation. The mixture is then boiled, filtered, bleached, slurried with water, treated with defined potassium and phosphorus salts, calcined and milled.

In another procedure, as described in U.S. Pat. No. 3,617,217, a measured quantity of a defined clarified, uncrystallized and unconcentrated titanium sulfate-ferrous sulfate solution is added to hot agitated water at defined intervals and at defined temperatures. The water is present in an amount ranging from 5 to 20% by volume of the measured quantity of solution. The final mixture is then boiled, filtered, bleached, slurried with water, treated with defined potassium and phosphorus salts, calcined and milled.

In an effort to produce high yields of high quality titanium dioxide, the art has tried to vary a vast array of operating parameters on what can best be described as a trial and error method. While occasionally resulting in acceptable results, there has been no assurance that essentially the best results have been obtained. This is particularly true when the quality or source of the titanium dioxide changes from time to time.

OBJECTS AND SUMMARY OF THE INVENTION

Accordingly, it is a general object of the present invention to solve or substantially alleviate the noted problems of the prior art.

It is a more specific object of the present invention to provide a process for preparing high quality titanium dioxide in either the anatase or rutile crystal form by controlling the amount of nucleii used in the preparation of titanium dioxide hydrate.

It is another object of the present invention to provide high quality titanium dioxide using a wide range of seed curing conditions.

It is a further object of the present invention to provide a process for preparing high quality titanium dioxide which can be incorporated into a coating composition which exhibits high levels of reflectance and tint strength.

It is a further object of the present invention to provide a process for preparing high quality titanium dioxide on a continuous basis.

It is still a further object of the present invention to provide a process for preparing high quality titanium dioxide wherein energy is conserved and strains on equipment are reduced by avoiding temperature cycling.

It is a yet further object of the present invention to provide a process for preparing high quality titanium dioxide wherein the purity and uniformity of particle size are improved.

In one aspect the present invention provides a process for preparing high quality titanium dioxide. The process comprises:

(a) forming a first acidified solution of titanium sulfate;

(b) forming a defined volume of a first seed solution precursor which comprises an acidified solution of titanium sulfate;

(c) selecting seed curing conditions of
  (i) a curing temperature in the range of from about 0° to about 100° C.;
  (ii) a curing time in the range of from about 2 seconds to about 150 hours; and
  (iii) an amount of alkaline neutralizing agent sufficient to neutralize from about 0 to about 60 mole % of the acid in the defined volume of the seed solution precursor whereby a curing pH in the range of from about 0.2 to about 7.0 is obtained;

(d) curing the seed solution precursor under the selected conditions to form a seed solution;

(e) mixing the seed solution with the acidified solution of titanium sulfate;

(f) establishing a mixture temperature sufficient to cause the formation of titanium dioxide hydrate;

(g) recovering the titanium dioxide hydrate;

(h) calcining the titanium dioxide hydrate to form titanium dioxide;

(i) incorporating the titanium dioxide in a defined amount into first and second coating compositions;

(j) measuring the reflectance of the first coating composition and the tint strength of the second coating composition;

(k) forming another acidified solution of titanium sulfate which is substantially identical to said first acidified solution of titanium sulfate;

(l) forming another seed solution precursor which is substantially identical to said first seed solution precursor;

(m) maintaining two of the seed curing conditions constant while selecting a different value of the third seed curing condition within the defined range;

(n) repeating steps (d) through (j) with said another seed solution precursor and said another acidified solution of titanium sulfate;

(o) repeating steps (k) through (n) a sufficient number of times with the same two seed curing conditions being maintained constant and the value of the third seed curing condition being different in each repetition to determine a maximum reflectance and tint strength; and (p) preparing high quality titanium dioxide using a seed solution which is formed from a seed solution precursor substantially identical in composition to the first seed solution precursor, is cured under the determined curing conditions and is mixed with an acidified solution of titanium sulfate substantially identical in composition to the first acidified solution of titanium sulfate in substantially the identical volume ratio.

In another aspect, the present invention provides a process for preparing high quality titanium dioxide in the rutile form by employing a defined seed precursor.

In a further aspect, the present invention provides a process for preparing high quality titanium dioxide continuously.

Further advantages and features of the invention as well as the scope, nature and utilization of the invention will become apparent to those skilled in the art from the description of the preferred embodiments of the invention set forth below.

BRIEF DESCRIPTION OF THE DRAWINGS

FIGS. 1 and 2 are schematic representations of two embodiments of a continuous process for preparing high quality titanium dioxide.

DESCRIPTION OF THE PREFERRED EMBODIMENTS

As stated hereinabove, the present invention relates to a process for preparing high quality titanium dioxide. The source of the titanium dioxide may be various titanium bearing materials including ilmenite ore or sand, ilmenite-hematite ore, titaniferous-magnetite ore, rutile ore or titanium bearing slag from the electrothermal production of pig iron. The preferred source of the titanium dioxide is ilmenite ore.

The titanium bearing material is crushed, if not already in finely divided form, is mixed with concentrated sulfuric acid (e.g., 66° Be) and is heated by direct contact with steam to a temperature in the range of from about 80° to about 120° C. as is well-known in the art (see aforementioned U.S. Pat. Nos. 3,615,204 and 3,617,207 the contents of which are incorporated by reference). The reaction is exothermic and upon continuous agitation results in a comparatively dry solid mass commonly referred to as the "digestion cake".

After curing for a time to permit maximum recovery of the titanium values (e.g., up to several days), the digestion cake is dissolved in water or weak acid and is typically contacted with scrap iron to convert the iron impurities in the mixture to the ferrous form.

To remove any unreacted raw material and insolubles, the mixture is subjected to settling and/or filtration (i.e., clarification). To facilitate this step, various known coagulating agents, such as sodium hydrosulfide and proteinaceous materials, are added to the mixture prior to clarification.

At this point in the process, the solution primarily contains sulfuric acid from the digestion step in an amount ranging from about 10 to about 35% by weight, titanium sulfate in an amount ranging from about 5 to about 25% by weight (as $TiO_2$) and ferrous sulfate in an amount ranging from about 2 to about 25% by weight. Of course, the particular composition of the solution is primarily dependent on the source of the titanium values. Small amounts of impurities, such as chromium and vanadium, may also be present. This solution may be directly used in the present invention. Alternatively, the iron content can be reduced via a crystallization step.

In the crystallization step, the solution is cooled to a temperature in the range of from about 5° to about 40° C. (e.g., using a vacuum crystallizer) to crystallize out a large portion of the iron as copperas, i.e., $FeSO_4.7H_2O$. The solution is filtered to remove the copperas crystals which are then usually given a light water wash to remove and recover any adhering solution. After crystallization, the solution contains sulfuric acid in an amount ranging from about 10 to about 40% by weight, titanium sulfate in an amount ranging from about 5 to about 30% by weight (as $TiO_2$) and ferrous sulfate in an amount ranging from 0 to about 10% by weight.

As should be apparent from the foregoing description, the solution entering the hydrolysis step can vary greatly depending on an array of factors. Since it is this digest solution which is used to form the titanium dioxide, it is important that the conditions employed to form the seed solution be selected such that when the seed solution is mixed with the digest solution, titanium dioxide with the best possible optical properties is ultimately prepared.

The seed solution is prepared from a seed solution precursor comprised of an acidified solution of titanium sulfate. Preferably, the seed solution precursor is a portion of the acidified solution of titanium sulfate from the digestion, clarification and, possibly, the crystallization steps.

It has been found that by using a constant volume of seed solution, the factors governing the number of nuclei prepared and hence the quality of the titanium dioxide product are the seed curing temperature, the seed curing time, the seed curing pH and the amount of alkaline neutralizing agent added to the seed solution precursor. The volume of seed solution precursor employed is such that when mixed with the original solution, it constitutes from about 0.1 to about 20%, preferably from about 1.0 to about 10.0% by volume.

To determine the curing conditions necessary for the preparation of high quality titanium dioxide in accordance with the present invention, a seed curing temperature, a seed curing time and an amount of alkaline neutralizing agent are selected. The seed curing temperature ranges from about 0° to about 100° C., preferably from about 60° to about 100° C. The amount of alkaline neutralizing agent is sufficient to neutralize from about 0 to about 60% mole %, preferably from about 0 to about 30 mole % of the acid in the seed solution precursor. The term "about 0" mole % indicates that a small amount of an acidic material may be used as the aqent in order to determine the optimum conditions.

The alkaline neutralizing agent can be any material which is soluble in water or in the seed solution precursor and serves to neutralize the acidity in the precursor without substantially adversely affecting the formation of the nuclei. Suitable alkaline neutralizing agents include ammonium hydroxide, ammonium carbonate, ammonium bicarbonate, soluble alkali metal hydroxides, carbonates and bicarbonates, soluble alkaline earth metal hydroxides and carbonates and mixtures thereof. Preferably, the alkaline neutralizing agent is selected from the group consisting of sodium hydroxide, sodium carbonate, sodium bicarbonate, potassium hydroxide, potassium carbonate, potassium bicarbonate and mixtures thereof. When an acidic material is employed, the agent may be any material which is soluble in water or in the seed solution and serves to increase the acidity (i.e., lower the pH) in the precursor solution without substantially adversely affecting the formation of the nuclei. Exemplary acidic materials are hydrochloric acid, nitric acid, phosphoric acid and preferably sulfuric acid.

The alkaline neutralizing agent is first prepared into an aqueous solution comprised of from about 0 to about 30% by weight, preferably from about 0 to about 10% by weight of the agent. To this solution is then added the seed solution precursor whereby the mixture (still referred to as the seed solution precursor) has a pH in the range of from about 0.2 to about 7.0, preferably from about 0.5 to about 4.0. Below a pH of about 0.2, no additional nuclei are formed.

The seed curing time ranges from about 2 seconds to about 150 hours, preferably from about 2 seconds to about 3 hours. The seed curing time is defined as the period starting with the initiation of nuclei formation (caused by reaching a pH between about 0.2 and about 7.0) and ending when the mixed seed solution precursor is stabilized (i.e., no further nuclei are formed).

The selection of the original conditions should be determined by the conditions at which the solution is to be cured on a regular basis. For example, if it is planned to operate the process with a relatively short curing time (e.g., 10 minutes), this time should be selected along with a convenient curing temperature, pH and amount of alkaline neutralizing agent. In this regard, since the curing time is inversely affected by the curing temperature and the amount of alkaline neutralizing agent, a fairly high temperature and/or amount of alkaline neutralizing agent should accordingly be originally selected.

After curing at the selected conditions, further addition of the seed precursor solution and/or an acidic material in an amount sufficient to obtain a pH of less than 0.2 is preferably employed to stabilize (i.e., prevent further nuclei formation and inhibit hydrolysis) the seed solution. The formed seed solution is thereafter mixed with the titanium sulfate solution from the digesting, clarifying and, possibly, crystallizing steps. Mixing can be accomplished by adding the seed solution to the titanium sulfate solution or vice versa.

The mixture is then subjected to a temperature sufficient to cause the formation of titanium dioxide hydrate. Typically, hydrolysis is achieved by heating the mixture to a temperature in the range of from about 85° to about 115° C. until hydrolysis is substantially complete. Depending on temperature, this normally requires from about 1.0 to about 6.0 hours.

The titanium dioxide hydrate is recovered from the mixture by well known techniques. Generally, the titanium dioxide hydrate is separated from the mixture via a series of filters with interstage washing and repulping of the filter cake to facilitate separation from the iron content of the mixture. The resulting filter cake can then be treated with a variety of conditioning agents, such as antimony trioxide, phosphorous pentoxide, alkali metal and alkaline earth metal oxides, carbonates and phosphates, which can be used to help control color and particle size growth.

The recovered titanium dioxide hydrate is next calcined to titanium dioxide by heating it to a temperature in the range of from about 750° to about 1000° C. Subsequent to the calcination step, the titanium dioxide may be subjected to grinding and other treatments depending on the intended use of the product.

To test the reflectance of the titanium dioxide product, it is formed into a standardized coating formulation. The formulation can be any one which adequately exhibits changes in reflectance when different qualities of titanium dioxide are incorporated therein. In general, coating formulations can be alkyd vehicles into which the titanium dioxide is incorporated. For example, reflectance can be determined in accordance with ASTM-E97-77.

Upon incorporating the titanium dioxide into the standardized coating formulation, applying the formulation to a planar surface of high reflectance, such as a white lacquered chart, and permitting it to dry, the reflectance is determined. This determination can be performed by various devices available in the market such as the Colormaster Differential Colorimeter manufactured by Manufacturers Engineering and Equipment Corporation of Hatboro, Pa.

To determine tint strength, the titanium dioxide is incorporated into any standard formulation (e.g., a modified black alkyd formulation which contains both pre-dispersed lamp black and Aerosil 200) which adequately exhibits changes in tint strength when different qualities of titanium dioxide are incorporated therein. The green reflectance value is then determined using the Colormaster Differential Colorimeter in a manner known to those skilled in the art.

At this point, a second acidified solution of titanium sulfate is formed. This can be a portion of the first solution or can be a further solution which is substantially identical to the first solution. In other words, the further solution can be prepared from the same raw material and subjected to the same process steps of digestion, clarification and crystallization.

A second seed solution precursor is also formed. As with the first seed solution precursor, it can be a portion of the second acidified solution of titanium sulfate or derived from a different source. However, the composition and the volume of this second seed solution precursor is substantially identical to the first seed solution precursor (i.e., before the aqueous solution of alkaline neutralizing agent is mixed therewith).

The second seed solution precursor is then prepared and subjected to curing in the manner previously discussed. The selected values of two of the three factors employed in the first seed curing step are maintained constant and the value of the third is varied within the stated range. For example, the curing temperature and amount of alkaline neutralizing agent can be maintained constant and a different curing time selected or the curing time and amount of alkaline neutralizing agent can be maintained constant and a different curing temperature selected. Since process equipment may be originally selected to operate at a certain curing temperature and curing time, the preferred situation is that the curing temperature and the curing time are maintained constant and a different amount of the alkaline neutralizing agent is selected.

The second cured seed solution is then mixed with the second acidified solution of titanium sulfate, subjected to a temperature sufficient to form titanium dioxide hydrate, recovered, conditioned, calcined incorporated into the standardized coating formulation and analyzed for reflectance and tint strength in a substantially identical manner as the first mixture of acidified solution of titanyl sulfate and seed solution. In other words, with the exception of the different value in the one seed curing factor, all other process conditions are as identical as possible to the first process run.

This procedure is repeated a sufficient number of times with a different value of the single seed curing factor employed each time until maximum values of reflectance and tint strength are obtained or can be reasonably predicted (e.g., via graph analysis). Of course, by the term "maximum" minor deviations are encompassed from the absolute maximum due to slight process variations. With the assurance that the best optical properties of reflectance and tint strength have been obtained under the established process conditions, preparation of high quality titanium dioxide can be instituted.

While it is apparent that other optical properties of the titanium dioxide can also be measured, such as tone or spectral characteristic (SCx), it is the characteristics of reflectance and tint strength which indicate a high quality titanium dioxide in accordance with the present invention. In this regard, while the seed curing conditions can be selected to maximize other optical characteristics, it does not necessarily follow that the reflectance and tint strength will be maximized. Conversely, by employing seed curing conditions that result in maximum reflectance and tint strength, it does not necessarily follow that other optical properties will be maximized.

To further ensure the high quality of the titanium dioxide, either or both of the two remaining seed curing factors can be varied to establish the conditions which produce the titanium dioxide with the maximum reflectance and tint strength values at what can be the most efficient conditions. For example, by slightly altering one seed curing condition (e.g., temperature, another (e.g., amount of alkaline neutralizing agent) can be beneficially changed (e.g., reduced) without detracting from the reflectance and tint strength values. Of course, if the characteristics of the acidified titanium solution are altered, such as by varying the raw material, the process of the present invention will be repeated to again establish the conditions necessary for the preparation of high quality titanium dioxide.

The process of the present invention is applicable to the preparation of titanium dioxide in either the anatase or rutile form with the former being obtained in accordance with the described process. If the rutile form of titanium dioxide is desired, rutile-promoting seeds may be mixed with the acidified solution of titanyl sulfate prior to the hydrolysis step or may be added to the anatase hydrolyzate prior to calcination.

To prepare a rutile-promoting seed solution precursor, a titanium tetrachloride solution containing from about 10 to about 40% by weight of titanium tetrachloride (as $TiO_2$) is formed. The seed solution precursor is then cured. The described three seed curing factors are employed in the same way to establish the maximum reflectance and tint strength values.

The process of the present invention is well suited for preparation of high quality titanium dioxide on either a batch or continuous basis. When compared to a batch process, a continuous process is particularly desirable since the hydrolysis tank does not need to be cleaned after each batch and there is less energy expended and strain placed on the equipment due to the elimination of temperature cycling of each batch. Moreover, nuclei preparation can be altered on stream to counteract digestion composition variations and variations of pigmentary characteristics can be altered on stream to obtain different optical properties. Yet further, by controlling the temperature at several stages during the hydrolysis step, impurity pick-up can be reduced and a more uniform particle size can be obtained.

As mentioned previously, FIGS. 1 and 2 are schematic representations of two embodiments of a continuous process for preparing high quality titanium dioxide. In the Figures, identical reference numbers refer to identical elements. Referring to FIG. 1, an acidified solution of titanium sulfate resulting from the digesting, clarifying and, possibly, crystallizing steps (i.e., a digest solution) is passed through line 10. A small portion of the solution is passed through line 11 through valve 12 to mixing chamber 13 which is provided with a pH monitor and, preferably, a temperature monitor and agitating means (not shown). Into the mixing chamber is also passed an aqueous solution of an alkaline neutralizing agent through line 14 and valve 15 and water through line 16 and valve 17. The purpose of the water is to provide the proper volume and water content of the seed solution for the main hydrolysis step.

The resulting mixture is passed through line 18 and valve 19 into curing chamber 20. The curing chamber can be a simple reactor provided with agitation means, a continuous tube reactor or other structures designed to handle the curing step. In any event, the curing chamber must be provided with temperature control means (not shown), such as a heat exchanger, and is preferably constructed so that a variable volume can be maintained therein.

The cured solution passes from the curing chamber through line 21 and valve 22 whereupon it is mixed with the remainder of the acidified solution of titanium sulfate which has passed through line 23. The mixture passes through line 24 into a first hydrolysis tank 25 preferably provided with a baffle to reduce backmixing therein. The mixture thereafter passes through line 27 into second hydrolysis tank 28, through line 29 into third hydrolysis tank 30 and through line 31 to fourth hydrolysis tank 32 whereupon the hydrolyzed mixture passes through line 33 to normal processing (e.g., filtration, calcining, etc.). Each of the hydrolysis tanks are insulated, have temperature control means (not shown) which are independently controlled and are provided with agitation means (not shown). Although four hydrolysis tanks have been illustrated, a greater or lesser number may be employed as desired or required.

To control the quality of the titanium dioxide product, a control means (not shown), such as a microprocessor, which is operatively connected to the pH monitor, valves 12, 15, 17, 19 and 22 and the temperature control means of the curing chamber. By regulating the flow through the various valves and the temperature in the curing chamber, the control means can control the seed curing temperature, seed curing time and the amount of alkaline neutralizing agent so as to obtain the desired properties of the titanium dioxide.

To establish the conditions necessary to obtain titanium dioxide with the maximum reflectance and tint strength values, a sample of the acidified solution of titanium sulfate to be passed through line 10 can be subjected to the procedure described previously wherein representative amounts of the solution are used to form the seed solution precursor and one of the three seed curing factors is varied to determine the maximum reflectance and tint strength values. Of course, as explained previously, the procedure can be repeated with one or both of the remaining factors to ascertain the maximum reflectance and tint strength values under the most efficient conditions.

An alternative procedure for establishing the seed curing conditions for high quality titanium dioxide is to use the control means to vary one of the seed curing factors until titanium dioxide with the desired optical properties is obtained. This procedure can be repeated with one or both of the other seed curing factors and the control means set so as to produce continuously high quality titanium dioxide with the desired optical properties.

The arrangement shown in FIG. 1 for the continuous preparation of titanium dioxide has the further advantage that the temperatures of each of the hydrolysis tanks can be individually controlled (e.g., by the control means). Temperature control of various stages of the hydrolysis step can be used to expedite the growth of the titanium dioxide hydrate, reduce impurity (i.e., chromium and vanadium) pick-up and control the size of the titanium dioxide hydrate agglomerates. For instance, a higher temperature (e.g., from about 100° to about 120° C.) can be used initially to start hydrate formation quickly. The temperature can then be lowered (e.g., from about 5° to about 20° C. less than the initial temperature) to reduce the amount of impurities trapped within the hydrate agglomerates as they grow in size. Finally, the temperature can be raised (e.g., to the boiling point) to obtain a high yield (e.g., greater than about 85%, preferably greater than about 90% recovery) of titanium dioxide hydrate.

FIG. 2 shows a similar arrangement wherein a portion of the acidified solution of titanyl sulfate passing through line 10 is used to form the seed solution precursor and is cured under the conditions established by the control means (not shown). However, in contrast to the embodiment illustrated in FIG. 1, hydrolysis is conducted by passing the mixture of the digest solution and seed solution into a single hydrolysis reactor which is in the configuration of an elongated tube. The hydrolysis reactor can be provided with agitation means (e.g., internal stationary vanes which cause the mixture to swirl), is thermally insulated and has temperature control means (not shown) whereby the temperature of various sections of the reactor can be individually controlled.

In operation, the arrangement illustrated in FIG. 2 is essentially identical to the previously described operation of the arrangement illustrated in FIG. 1 with high quality titanium dioxide again being the end result. With both embodiments, should titanium dioxide in the rutile form be desired, the appropriate rutile-forming seed precursor can be used in place of the portion passed through line 11 or an appropriate rutile-forming seed can be mixed with the formed titanium dioxide hydrate prior to calcination as explained previously.

Having thus been disclosed, the present invention is exemplified in the following examples. It is to be understood, however, the present invention is not to be limited to the specifics thereof.

EXAMPLE 1

A clarified, uncrystallized digest solution at 50° C. containing 8.33% of titanium sulfate (as $TiO_2$), 16.7% sulfuric acid, 22.52% ferrous sulfate (all percentages by weight) and 42 ppm chromium and 110 ppm vanadium is prepared. From the digest solution, 150 ml portions are withdrawn to use as the seed solution precursor.

The portions of seed solution precursor are each added to 225 ml of water and various amounts of sulfuric acid (to retard nuclei formation), various amounts of sodium bicarbonate solution or nothing over 120 seconds. The amounts of sodium bicarbonate are recorded by indicating the amount of digest solution necessary to neutralize (i.e., reach a pH of 7.0) the sodium bicarbonate solution. The curing temperature is maintained constant at 91° C.

The portions of the cured seed solution are then mixed with digest solution, to bring the volume ratio of the digest solution to water to 98:2 and to give a total volume of 3 liters. The mixtures are hydrolyzed at 109° C. for 3 hours and are treated with 0.25% potassium oxide, 0.30% phosphorus pentoxide and 0.012% antimony oxide (all percentages by weight).

Calcination of each batch of the titanium dioxide hydrate is achieved by heating at 950° C. for 2 hours. The batches of titanium dioxide are ground using a chaser roller mill to obtain a product size of −325 mesh. 1.5 g of the titanium dioxide is then incorporated into 3.4 ml of a standardized fast drying white alkyd coating formulation containing Aeroplast 6008 on a Hoover automatic Muller and coated to 0.009 in. on a white lacquered chart. The reflectance is then determined using a Colormaster Differential Colorimeter. The determination of reflectance is in accordance with ASTM-E97-77.

Tint strength is determined by incorporating 1.9 grams of the titanium dioxide in 2.5 grams of a standardized modified black alkyd formulation containing Alkydol L-64, Aerosil 200 and lamp black 101. The resulting formulation is coated on a white lacquered chart and analyzed using the Colormaster Differential Colorimeter. This procedure is based on ASTM-E27-45.

Also tested are tone and spectral characteristic (SCx) and the overall pigment quality is assessed. Tone is determined by the blue reflectance value minus the red reflectance value of the white alkyl formulation as analyzed with the Colormaster Differential Colorimeter. SCx is determined by the blue reflectance value minus the red reflectance value of the standardized black alkyd formulation as analyzed with the Colormaster Differential Colorimeter. Pigment quality is a composite of the optical properties with excellent quality being obtained with a reflectance value of at least 91.5, a tone value less than −2.7, a tint strength value of at least 1300 and a SCx of about 2.5.

The results of runs A to I are set forth in Table I.

TABLE I

| Run | Additive | % Conversion[1] of digest liquor to TiO$_2$ (time) | % Rutile | Optical Properties | | | | Pigment Quality |
|---|---|---|---|---|---|---|---|---|
| | | | | Dry Film Color | | MAB | | |
| | | | | Refl | Tone | TCS | SCx | |
| A | 22 ml acidified (H$_2$SO$_4$) | 70.4% (3 hrs) | 3% | 90.9 | −5.6 | 1175 | 1.4 | Poor |
| B | 11 ml acidified (H$_2$SO$_4$) | 90.2% (3 hrs) | 1% | 90.8 | −2.5 | 1285 | 0.8 | Fair |
| C | 0 ml buffered | 91.2% (3 hrs) | 1% | 91.9 | −2.8 | 1455 | 4.0 | Good |
| D | 11 ml buffered (NaHCO$_3$) | 92.9% (3 hrs) | 1% | 91.4 | −3.0 | 1445 | 3.4 | Fair |
| E | 22 ml buffered (NaHCO$_3$) | 92.7% (3 hrs) | 1% | 91.2 | −3.0 | 1445 | 3.4 | Fair |
| F | 33 ml buffered (NaHCO$_3$) | 92.2% (3 hrs) | 1% | 91.6 | −3.0 | 1445 | 4.0 | Fair |
| G | 44 ml buffered (NaHCO$_3$) | 93.1% (3 hrs) | 1% | 90.6 | −4.4 | 1315 | 3.4 | Poor |
| H | 55 ml buffered (NaHCO$_3$) | 93.6% (3 hrs) | 15 | 90.4 | −5.9 | 1335 | 2.0 | Poor |
| I | 66 ml buffered (NaHCO$_3$) | 93.3% (3 hrs) | 1% | 90.5 | −6.0 | 1305 | 3.1 | Poor |

[1]Standard recoveries based on analysis of digest solution from which the titanium dioxide hydrate is removed.

From the foregoing results, the maximum reflectance and tint strength values are obtained in Run C wherein the seed solution precursor is prepared in the absence of either acid or alkaline neutralizing agent. Hence, by using the process of the present invention, the defined digest solution may be used to obtain maximum reflectance and tint strength values while concurrently operating at a high temperature in the absence of any alkaline neutralizing agent.

liters. The mixtures are hydrolyzed at 109° C. for 3 hours and the titanium dioxide hydrate is treated and calcined as in Example 1. The reflectance, tint strength, tone and SCx are determined after one hour of calcination and upon completion in accordance with the methods described in Example I. The results of runs J to Q are set forth in Table II. As can be seen from the results, a variation in digest solution and seed solution precursor yields different optical properties when otherwise treated identically.

TABLE II

| Run | Digest Solution (% by weight) | | | Description | % Conversion | Calcination Conditions | Optical Properties | | | |
|---|---|---|---|---|---|---|---|---|---|---|
| | H$_2$SO$_4$ | TiSO$_4$ (as TiO$_2$) | FeSO$_4$ | | | | Dry Film Color | | MAB | |
| | | | | | | | Refl | Tone | TcS | SCx |
| J | 18.98 | 8.7 | 19.96 | 0 ml buffered | 87.9% | 950 C (1 hr) | 92.2 | −2.2 | 1340 | 5.1 |
| | | | | | | 950 C (2 hr) | 92.4 | −3.0 | 1335 | 3.5 |
| K | 18.67 | 8.71 | 20.70 | 5 ml buffered | 92.6% | 950 C (1 hr) | 92.2 | −1.7 | 1380 | 6.1 |
| | | | | | | 950 C (2 hr) | 92.6 | −2.5 | 1430 | 4.5 |
| L | 19.09 | 8.54 | 20.65 | 5 ml buffered | 89.5% | 950 C (1 hr) | 92.1 | −2.0 | 1295 | 7.2 |
| | | | | | | 950 C (2 hr) | 92.6 | −3.3 | 1290 | 4.9 |
| M | 18.75 | 8.61 | 20.87 | 7.5 ml buffered | 91.8% | 950 C (1 hr) | 92.0 | −1.9 | 1355 | 7.1 |
| | | | | | | 950 C (2 hr) | 92.4 | −3.1 | 1360 | 5.2 |
| N | 18.75 | 8.61 | 20.87 | 7.5 ml buffered | 91.5% | 950 C (1 hr) | 92.0 | −1.8 | 1375 | 6.5 |
| | | | | | | 950 C (2 hr) | 92.5 | −2.6 | 1410 | 4.8 |
| O | 20.13 | 8.76 | 19.79 | 10 ml buffered | 92.0% | 950 C (1 hr) | 91.5 | −2.0 | 1320 | 6.5 |
| | | | | | | 950 C (2 hr) | 91.8 | −3.3 | 1265 | 3.9 |
| P | 19.35 | 8.90 | 20.13 | 10 ml buffered | 92.6% | 950 C (1 hr) | 91.5 | −1.6 | 1315 | 6.7 |
| | | | | | | 950 C (2 hr) | 92.1 | −3.1 | 1255 | 3.8 |
| Q | 18.98 | 8.70 | 19.96 | 10 ml buffered | 93.2% | 950 C (1 hr) | 92.1 | −2.5 | 1375 | 5.9 |
| | | | | | | 950 C (2 hr) | 92.0 | −3.2 | 1280 | 3.8 |

EXAMPLE 2

Clarified, uncrystallized digest solutions having various compositions are prepared. From the digest solution, 125 ml portions are withdrawn to form the seed solution precursor.

The portions of the seed solution precursor are each added to 125 ml of water containing either nothing or various amounts of sodium hydroxide to neutralize various amounts of the seed solution precursor. The amount of seed solution precursor added initially to the water of sodium hydroxide solution is sufficient to reach a pH of 2.0. The curing temperature is maintained constant at 75° C. and the curing time is maintained constant at 20 minutes. At this time, the remainder of the 125 ml portion of the seed solution precursor is added to stabilize the solution.

The portions of the cured seed solution are then mixed with the digest solution to give a volume ratio of digest solution to water of 98:2 and a total volume of 3

EXAMPLE 3

A clarified, uncrystallized digest solution containing 8.24% titanium sulfate (as TiO$_2$), 18.33% sulfuric acid and 18.71% ferrous sulfate (all percentages by weight) is prepared. From the digest solution, 125 ml portions of are withdrawn to form the seed solution precursor.

The portions of seed solution precursor are mixed with 125 ml of water containing sodium hydroxide in an amount sufficient to buffer 40 ml of the seed solution precursor until a pH of 2.0 is reached. The solutions are cured at a temperature of 28° C. for various curing times.

After curing, the remaining amount of the seed solution is added and the portions are mixed with the digest solution to obtain a volume ratio of digest solution to water of 98:2 and a total volume of 3 liters. The mixtures are then processed (i.e., hydrolyzed, recovered, conditioned, calcined and ground) as described in Example 1. The percentage of conversion is determined by analysis of the digest solution from which the titanium dioxide hydrate is removed and the results of runs R to T are set forth in Table III.

TABLE III

| Run | Description | % Conversion Final Recoveries (MSA) |
| --- | --- | --- |
| R | 40 ml buffering/ 125 ml digest solution 4 hr seed curing time | 76.1% |
| S | 40 ml buffering/ 125 ml digest solution 51 hr seed curing time | 92.0% |
| T | 40 ml buffering/ 125 ml digest solution 72 hr seed curing time | 91.1% |

EXAMPLE 4

A clarified, uncrystallized digest solution having a density of 1.55 g/ml and containing 8.76% titanium sulfate (as $TiO_2$), 20.13% sulfuric acid and 19.79% ferrous sulfate (all percentages by weight) is prepared continuously at a rate of 100 ft$^3$/min. Seed solution precursor is withdrawn from the stream of digest solution at a rate of 0.1 ft$^3$/min as controlled by a microprocessor. Based on previous experimentation, the microprocessor is adjusted so that the precursor is mixed with water at a rate of 1.8 ft$^3$/min and sufficient alkaline neutralizing agent to maintain a pH of 2.2 (e.g., a flow rate of about 0.5 ft$^3$/min) and is cured for 20 minutes at 75° C.

The seed solution is mixed with the stream of digest solution and is passed to a first hydrolysis tank which is maintained at 105° C. and which is equipped with a perforated baffle to minimize back-mixing. The mixture is then passed to a second hydrolysis tank at 102° C., a third hydrolysis tank 100° C. and a fourth hydrolysis tank at 105° C., each of these tanks being equipped with an agitator. The total hydrolysis time is about 4 hours and an efficiency of about 90% is obtained.

The hydrolyzed titanium dioxide is then recovered, conditioned, calcined, ground, etc. in accordance with known techniques whereby a high quality titanium dioxide is prepared.

The invention being thus described and exemplified, it will be obvious that the invention may be varied in many ways. Such variations are not to be regarded as a departure from the soirit and scope of the invention and all such modifications are intended to be included within the scope of the following claims.

What is claimed is:

1. A process for preparing high quality titanium dioxide comprising:
    (a) forming a first acidified solution of titanium sulfate;
    (b) forming a defined volume of a first seed solution precursor which comprises an acidified solution of titanium sulfate;
    (c) selecting seed curing conditions of
        (i) a curing temperature in the range of from about 0° to about 100° C.,
        (ii) a curing time in the range of from about 2 seconds to about 150 hours, and
        (iii) an amount of alkaline neutralizing agent sufficient to neutralize from about 0 to about 60 mole % of the acid in the defined volume of the seed solution precursor whereby a curing pH in the range of from about 0.2 to about 7.0 is obtained;
    (d) curing the seed solution precursor under the selected conditions to form a seed solution;
    (e) mixing the seed solution with the acidified solution of titanium sulfate;
    (f) establishing a mixture temperature sufficient to cause the formation of titanium dioxide hydrate;
    (g) recovering the titanium dioxide hydrate;
    (h) calcining the titanium dioxide hydrate to form titanium dioxide;
    (i) incorporating the titanium dioxide in a defined amount into first and second coating compositions;
    (j) measuring the reflectance of the first coating composition and the tint strength of the second coating composition;
    (k) forming another acidified solution of titanium sulfate which is substantially identical to said first acidified solution of titanium sulfate;
    (l) forming another seed solution precursor which is substantially identical to said first seed solution precursor;
    (m) maintaining two of the seed curing conditions constant while selecting a different value of the third seed curing condition within the defined range;
    (n) repeating steps (d) through (j) with said another seed solution precursor and said another acidified solution of titanium sulfate;
    (o) repeating steps (k) through (n) a sufficient number of times with the same two seed curing conditions being maintained constant and the value of the third seed curing condition being different in each repetition to determine a maximum reflectance and tint strength; and
    (p) preparing high quality titanium dioxide using a seed solution which is formed from a seed solution precursor substantially identical in composition to the first seed solution precursor, is cured under the determined curing conditions giving the maximum values of reflectance and tint strength and is mixed with an acidified solution of titanium sulfate substantially identical in composition as the first acidified solution of titanium sulfate in substantially the identical volume ratio.

2. The process of claim 1 wherein the seed curing conditions are selected from:
    (i) a curing temperature in the range of from about 60° to about 100° C.;
    (ii) a curing time between about 2 seconds and about 3 hours and;
    (iii) an amount of alkaline neutralizing agent sufficient to neutralize from about 0 to about 30 mole % of the acid in the defined volume of the seed solution precursor.

3. The process of claim 1 wherein the curing temperature and the amount of alkaline neutralizing agent are maintained constant and the curing time is varied.

4. The process of claim 1 wherein the curing time and the amount of alkaline neutralizing agent are maintained constant and the curing temperature is varied.

5. The process of claim 1 wherein the curing time and curing temperature are maintained constant and the amount of alkaline neutralizing agent is varied.

6. The process of claim 1 wherein the alkaline neutralizing agent is selected from the group consisting of ammonium hydroxides, carbonates and bicarbonates, soluble alkali metal hydroxides, carbonates and bicarbonates, soluble alkaline earth metal hydroxides and carbonates, and mixtures thereof.

7. The process of claim 6 wherein the alkaline neutralizing agent is selected from the group consisting of sodium hydroxide, sodium carbonate, sodium bicarbonate, potassium hydroxide, potassium carbonate, potassium bicarbonate and mixtures thereof.

8. The process of claim 1 wherein the high quality titanium dioxide is prepared on a continuous basis.

9. The process of claim 8 wherein the curing temperature and the curing time are maintained constant and wherein a portion of a stream of an acidified solution of titanium sulfate is continuously drawn off to form the seed solution precursor, the pH of the portion is measured and an amount of alkaline neutralizing agent is added in response thereto whereby upon curing for the selected time at the selected temperature and pH, the seed solution, when mixed with the stream of the acidified solution titanium sulfate, results in said high quality titanium dioxide.

10. The process of claim 8, wherein the amount of alkaline neutralizing agent and curing time are maintained constant and wherein a portion of a stream of an acidified solution of titanium sulfate is continuously drawn off to form the seed solution precursor, the temperature of the portion is adjusted whereby upon curing for the selected time in the presence of the selected amount of alkaline neutralizing agent, the seed solution, when mixed with the stream of the acidified solution, results in said high quality titanium dioxide.

11. The process of claim 8 wherein the amount of alkaline neutralizing agent and the curing temperature are maintained constant and wherein a portion of a stream of an acidified solution of titanium sulfate is continuously drawn off to form the seed solution precursor, the curing time is adjusted whereby upon curing in the presence of the selected amount of alkaline neutralizing agent at the selected temperature, the seed solution when mixed with the stream of the acidified solution results in said high quality titanium dioxide.

12. The process of claim 1 wherein the seed solution precursor is a portion of the acidified solution of titanium sulfate 13. The process of claim 1 wherein the defined volume results in a seed solution that comprises from about 0.1 to about 20% by volume of the mixture with the acidified solution of titanium sulfate.

14. The process of claim 1 wherein upon determining the conditions for maximum reflectance and tint strength, the values for a different condition are varied in accordance with steps (a) through (o) and the high quality titanium dioxide is prepared under the determined conditions to obtain the higher reflectance and tint strength.

15. The process of claim 14 wherein the values for the third condition are varied in accordance with steps (a) through (o) and the high quality titanium dioxide is prepared under the determined conditions to obtain the highest reflectance and tint strength.

16. The process of claim 1 wherein high quality titanium dioxide in the rutile form is prepared by incorporating a rutile-forming seed composition to the recovered titanium dioxide hydrate.

17. A process for preparing high quality titanium dioxide in the rutile form comprising:
(a) forming a first acidified solution of titanium sulfate;
(b) forming a defined volume of a first rutile-forming seed solution precursor;
(c) selecting seed curing conditions of
 (i) a curing temperature in the range of from about 0° to about 100° C.,
 (ii) a curing time in the range of from about 2 seconds to about 150 hours, and
 (iii) an amount of alkaline neutralizing agent sufficient to neutralize from about 0 to about 60 mole % of the acid in the defined volume of the seed solution precursor whereby a curing pH in the range of from about 0.2 to about 7.0 is obtained;
(d) curing the rutile-forming seed solution precursor under the selected conditions to form a rutile-forming seed solution;
(e) mixing the rutile-forming seed solution with the acidified solution of titanium sulfate;
(f) establishing a mixture temperature sufficient to cause the formation of titanium dioxide hydrate;
(g) recovering the titanium dioxide hydrate;
(h) calcining the titanium dioxide hydrate to form titanium dioxide in the rutile form;
(i) incorporating the titanium dioxide in a defined amount into first and second coating compositions;
(j) measuring the reflectance of the first coating composition and the tint strength of the second coating composition;
(k) forming another acidified solution of titanium sulfate which is substantially identical to said first acidified solution of titanium sulfate;
(l) forming another rutile-forming seed solution precursor which is substantially identical to said first rutile-forming seed solution precursor;
(m) maintaining two of the seed curing conditions constant while selecting a different value of the third seed curing condition within the defined range;
(n) repeating steps (d) through (j) with said another rutile-forming seed solution precursor and said another acidified solution of titanium sulfate;
(o) repeating steps (k) through (n) a sufficient number of times with the same two seed curing conditions being maintained constant and the value of the third seed curing condition being different in each repetition to determine a maximum reflectance and tint strength; and
(p) preparing high quality titanium dioxide in the rutile form using a seed solution which is formed from a rutile-forming seed solution precursor substantially identical in composition to the first rutile-forming seed solution precursor, is cured under the determined curing conditions giving the maximum values of reflectance and tint strength and is mixed with an acidified solution of titanium sulfate substantially identical in composition as the first acidified solution of titanium sulfate in substantially the identical volume ratio.

18. The process of claim 17 wherein the rutile-forming seed solution precursor comprises an acidified solution of titanium tetrachloride.

* * * * *